Jan. 12, 1960    J. C. MARGETIC ET AL    2,920,724
AUTOMATIC SLACK ADJUSTER FOR BRAKES
Filed Oct. 26, 1956    2 Sheets-Sheet 1

INVENTORS
Joseph C. Margetic
Christ A. Oppegard
BY
Leonard S. Knox
Attorney

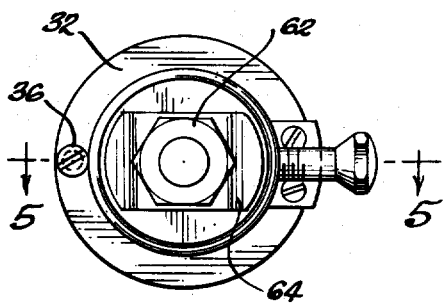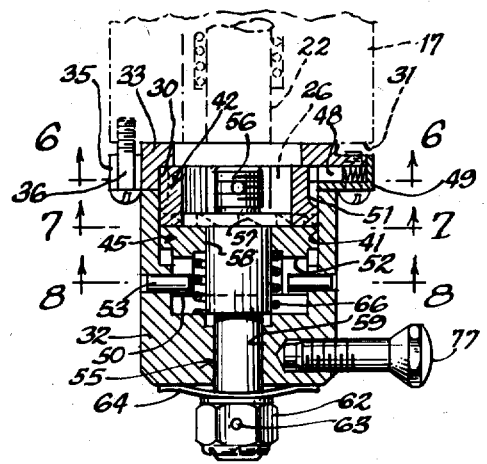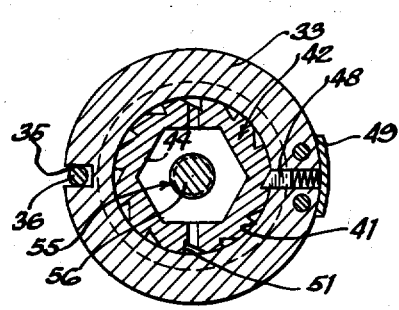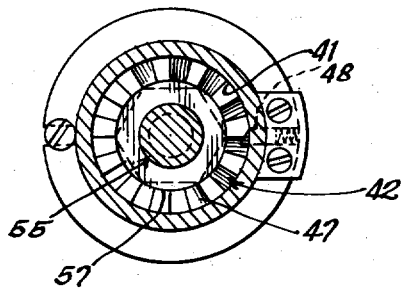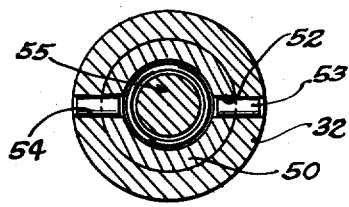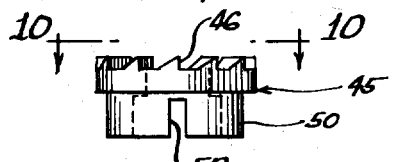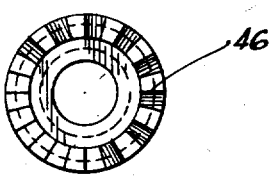

United States Patent Office

2,920,724
Patented Jan. 12, 1960

2,920,724

AUTOMATIC SLACK ADJUSTER FOR BRAKES

Joseph C. Margetic and Christ A. Oppegard, Chicago, Ill.

Application October 26, 1956, Serial No. 618,642

3 Claims. (Cl. 188—196)

This invention relates to mechanism for automatically taking up the play which develops between the movable elements of an automotive brake and the member which transmits the operating force thereto as the brake lining and the mechanical parts cooperative therewith undergo normal wear.

For example, in the case of a brake comprising arcuate shoes adapted to be brought into frictional contact with the inner periphery of a brake drum, wear of the brake lining and of the joints of the linkage connecting the brake pedal to the shoes, whether a direct connection or through the intermediary of a boost system such as a hydraulic piston and cylinder, results in slack between the pedal and shoes. Unless such slack is taken up periodically by adjustment at some reasonable intervals the brake is eventually rendered incapable of being actuated.

In one form of mechanism known to us the cam which actuates the brake shoes outwardly against the drum is keyed on a shaft with a worm gear. A worm engages the gear and is housed for rotation in a crank arm which also rotatably supports the worm gear. The crank arm is connected to the brake rod and therefore, by joint movement of the worm and worm gear without relative rotation between these latter, translates linear motion of the rod into rotation of the cam and consequent actuation of the brake shoes. By rotating the worm and hence the worm gear the angular relation of the cam shaft relative to the crank arm may be changed thereby, in effect, changing the relation of the brake rod to the cam. It will be understood that the helix angle of the worm gear and worm is of a sufficiently low value to insure that the worm gear does not drive the worm, for otherwise the adjustment is lost. Thus slack developed between the brake rod and shoes may be taken up by manual adjustment, namely, by rotation of the worm at some regular servicing interval, or as required.

It is highly desirable to provide that the slack be taken up automatically whereby to maintain the brakes continuously in prime operating condition rather than to rely upon a servicing schedule which may not be adhered to.

Accordingly the principal object of our invention consists in providing mechanism for automatically adjusting the slack in an automotive vehicle brake mechanism.

Another object is to provide automatic slack adjusting mechanism as aforesaid which may be combined with present designs of manual slack adjusters with only minor problems of adaptation and without the need of disassembling the adjuster or the brakes.

A further object is to provide mechanism in accordance with the foregoing which comprises simple, inexpensive parts arranged to require only ordinary lubrication and no adjustment per se.

A still further object is to provide mechanism for the purpose stated which is adapted for use with conventional forms of brakes whether operated manually or through power boost.

Other objects will appear as the description proceeds. A preferred embodiment of the invention is illustrated in the drawings in which:

Fig. 4 is an end elevation of the ratchet housing;

Fig. 5 is a cross section on the line 5—5 of Fig. 4;

Fig. 6 shows a cross section on the line 6—6 of Fig. 5;

Fig. 7 is a cross section on the line 7—7 of Fig. 5;

Fig. 8 is a cross section on the line 8—8 of Fig. 5;

Fig. 9 is a detail of the ratchet pawl; and

Fig. 10 is a detail of the pawl of Fig. 9 as seen in the direction of the arrows 10—10 therein.

Regarded in its broad aspect the invention is in the nature of an attachment which is arranged to be adapted to present types of manual slack adjusting devices although, as will appear, the same can readily be integrated with the brake mechanism as original equipment. In its primary significance, incorporation of the invention does not require that the brake shoes and their immediate actuating mechanism undergo any significant change. In one environment to which the invention may be adapted, an existing worm and meshing worm gear are arranged to change the relation between the brake rod and the cam which actuates the brake shoes thereby to neutralize any slack theretofore developed. In such arrangement the worm is arranged to be rotated step-by-step by appropriate intermittently-operating means, such as a pawl and ratchet. The pawl is pulsed each time the brakes are operated by connecting the same to the brake rod. If wear has proceeded to the point where movement of the rod is such as to throw the pawl one tooth space or more of the ratchet this latter is rotated and thus rotates the worm to take up the slack. If wear is of a degree not necessitating adjustment movement of the rod is insufficient to throw the pawl one tooth space and the pawl simply idles, the ratchet remains unaffected and no slack adjustment is accomplished. In general the invention may be applied to virtually all known types of brakes by arranging the same in a manner which will translate overtravel of the brake rod or an equivalent function into actuation of the existing slack adjusting means. Moreover the invention may be incorporated with brake mechanisms which are operated manually or by power boost; viz: hydraulic, pneumatic, vacuum or electrical.

Figure 1:
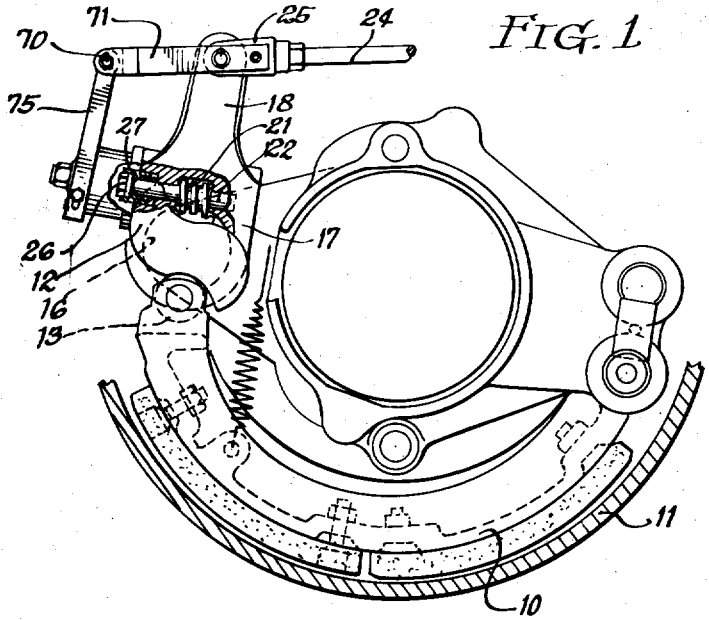
Fig. 1 is a cross section of a drum type of automotive brake incorporating our invention.

By way of example we will disclose the invention as applied to a common type of brake arrangement as used with an automotive bus and which incorporates a manual, worm-and-worm gear slack adjusting device of the character referred to above. Thus, referring to Fig. 1 the brake shoes 10 (only one of which is shown for clarity) are adapted to be moved into frictional engagement with the brake drum 11 by an S-shaped cam 12 having followers 13 carried on the shoes. Cam 12 is secured to a worm gear 16 for rotation therewith. A housing 17 for the worm gear 16 is constituted as part of a crank arm 18 which is mounted for swinging movement about the center of the worm gear by means not shown. A worm 21 is meshed with the worm gear and is provided with a shaft 22 rotatably mounted in the housing 17. Assuming some fixed relation between the worm and worm gear and that the worm is fixed against rotation as by providing a small helix angle, some predetermined rocking movement of the arm 18 is effective to operate the brake shoes to braking position wherefrom they are returned by bias means. A brake rod 24 is connected to the crank arm 18 by a clevis 25 whereby operation of the brake may be remotely controlled. It will be understood that rod 24 may be the piston rod of a piston-and-cylinder type of power boost or may be otherwise connected to be responsive to operation of the brake pedal. In any case each operation of the brake pedal includes a ricprocating motion of the rod 24 and corresponding oscillatory motion of the arm 18.

Assuming a certain position for the arm 18 and the existence of play or slack in the relation of the rod to the cam 12, such as may be due to ordinary wear of the various parts including the brake lining, such slack may be eliminated by rotating the cam 12 relative to the arm 18. In the case of a manual slack adjuster, the mechanic fits a wrench over an hexagonal termination or spud 26 of the shaft 22 and rotates the worm 21 which, in turn, rotates the worm gear 16 and its thereto-secured cam 12 to take up the backlash to restore normal actuation of the brakes. A spring-pressed collar 27 splined in the housing 18 and having an hexagonal opening complemental to spud 26 serves to retain the shaft 22 in its adjusted position but is capable of axial dislodgment upon application of the wrench to the spud. Removal of the wrench allows the collar to spring back to lock the spud.

As so far described the exemplificative environment to which our invention is adapted is substantially one in common use. However, the invention is capable of being otherwise embodied without departing from the principles thereof now to be disclosed.

That face 31 of the housing 17 (Figs. 2 and 5) adjacent the spud 26 is utilized for mounting a bracket 33 which is counterbored at 30 and is drilled or slotted at 35 to receive one or more screws 36. The face 31 is tapped to receive these latter thus constituting one step in adapting the invention device.

Adapted for rotation with respect to the bracket 33 and abutting the outer face of the same is a casing 32 provided with a cylindrical bore 41 of the same diameter as counterbore 30 and which jointly rotatably receive a ratchet wheel 42 having radially-disposed teeth (Figs. 5, 6 and 7). This latter has a central hexagonal opening 44 congruent with the spud 26 whereby rotation of the ratchet wheel is effective to rotate the worm 21 for slack adjustment as described.

A pawl 45 (Fig. 9) is also rotatably received in bore 41 (Fig. 5) and is provided with a plurality of radially disposed teeth 46 adapted to engage the teeth 47 of the ratchet wheel 42. A spring pressed detent 48 is carried in a bracket 49 and engages successive, axially-disposed teeth 51 (Fig. 6) of the ratchet wheel 42 to prevent reverse movement thereof as the pawl 45 is returned following an active stroke thereof.

A pawl 45 is also provided with a reduced portion 50 which is slotted at diametrically opposed points 52 (Fig. 8) for engagement with driving pins 53 fixed in bores 54 in the wall of the casing 32 whereby rotation of the casing directly effects rotation of the pawl.

The casing 32 is supported for rotation on a post 55 having a stud 56 threadedly engaged in a corresponding aperture formed in the spud 26 and pinned thereto. A flange 57 abuts the outer surface of the spud in order to assure axial alignment of the shaft 22 and post 55.

Pawl 45 has running clearance on the post 55 by means of a bore 58. Casing 32 is arranged to rotate on post 55 through the medium of a bore 59 and is retained thereon by a nut 62 pinned at 63. A leaf spring 64 is interposed between the nut 62 and the outer end face of the casing 32 to force the latter into close abutment with the bracket 33 whereby to prevent entry of foreign matter. A compression spring 66 is interposed between the casing 32 and pawl 45 to maintain the teeth thereof in operative relation with the teeth of the ratchet wheel.

From the preceding it will have become evident that oscillating movement imparted to the casing 32 will effect step by step movement of the ratchet wheel 42 and consequent step by step adjustment of the relative position of the worm and worm gear for appropriate take-up of slack.

Figure 2:
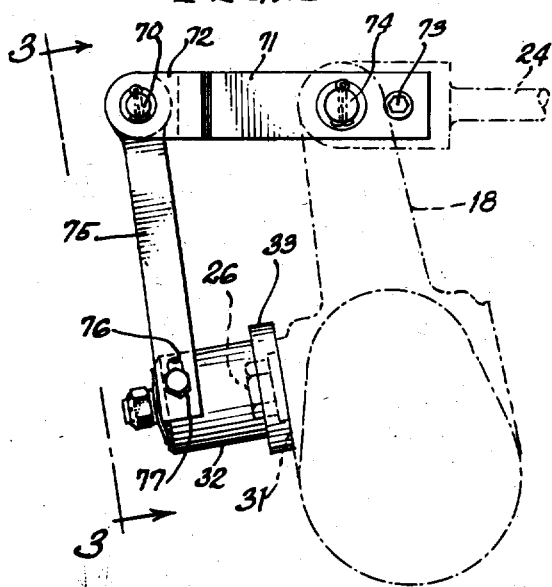
Fig. 2 is a side elevational view of a portion of Fig. 1, but showing the mechanism in another operated position.
Figure 3:
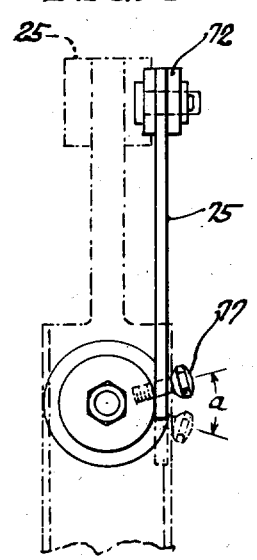
Fig. 3 is an end elevation of the mechanism shown in Fig. 2 as seen in the direction of the arrows 3—3 therein.

The necessary oscillatory actuation of casing 32 is achieved by providing a linkage between the brake rod and the casing. Turning to Figs. 2 and 3 an extension piece 71, having a forked end 72, is secured to the clevis 25 by a cap screw 73 and a headed pin 74. Pin 74 simply replaces the pin ordinarily connecting the clevis 25 and arm 18. A washer and cotter pin complete the joint. The end 72 of the extension 71 is articulated by a pin 70 to a link 75 having a slot 76 loosely engaged over a headed stud 77 threadedly set into the casing 32.

Thus, upon each actuation of the brakes the rod 24 is thrust rearwardly (to the left in the drawings). Such movement lengthens the distance between the center of the pin 70 and the stud 77 and, if the brakes are in acceptable adjustment, the slotted hole 76 will only slide freely on the stud or perhaps shift the stud over some slight angle. Return movement of the rod 24 will provide a similar result. Under such conditions the pawl 45 will swing with respect to the ratchet wheel a short distance, but less than one tooth space of the ratchet wheel. On the other hand if unacceptable slack has developed the amount of movement which must be imparted to the rod 24 is greater than normal and the stroke of the pawl will be greater than one tooth space of the ratchet. In such case the ratchet wheel will be rotated one or more tooth spaces to take up the slack by an equivalent amount. The pitch of the teeth of the ratchet wheel may easily be so related to the stroke of the brake rod as to take up the slack in any desired increments, whether fine or coarse. Similarly the rotation of the ratchet wheel with respect to the stroke of the brake rod may be proportioned as desired by introducing a different linkage between the brake rod and the stud 77.

From the foregoing it will have become apparent that we have provided automatic slack adjusting mechanism which eliminates the haphazard character of sporadic manual adjustments thereby decreasing maintenance cost, assuring equalized braking effort on all wheels of the vehicle and increasing the life of the brake lining, drum and tires by distributing the braking force equally on all of the wheels. In the case of booster operation the invention increases the life of the compressor or pump due to lessened diaphragm or piston travel; improves brake response and, when servicing is required, the invention unit may be removed and the manual adjusting means immediately and temporarily restored to use.

While we have shown a particular embodiment of our invention, it will be understood of course that we do not wish to be limited thereto since many modifications may be made and we therefore contemplate by the appended claims to cover any such modifications as fall within the true spirit and scope of our invention.

We claim:

1. An attachment for converting manually-operated mechanism for taking up the slack in a brake to automatic operation, the mechanism being of the type wherein the connection between the brake rod and the brake shoes includes a linkage having two angularly adjustable parts, one of which parts is a worm gear and cam fixed for joint rotation, said cam operating the brake shoes, and the other part is a worm in mesh with said worm gear and slack is taken up by rotating the worm to alter the angular relation of said parts and therefore the relationship between the brake rod and brake shoes, said worm and worm gear being rotatably mounted in a housing having an arm extending radially with respect to the axis of the worm gear the end of the arm being articulated with the brake rod, the worm having a shaft with a spud end thereon accessible on a surface of the housing for rotation of said arm comprising: a bracket, means for securing said bracket to the surface, a ratchet wheel adapted for coaxial alignment with the worm shaft rotatably carried in the bracket, means for keying the ratchet wheel to the spud end for joint rotation of the wheel and worm; a post adapted to be secured to the spud end coaxial with the worm shaft, a pawl rotatably carried on said post for coaction with said ratchet wheel for stepping the worm in a direction to take up slack, a hollow cylindrical member rotatably mounted on said post, an operative connection between said member and pawl whereby oscillatory movement of said member oscillates said pawl, means for connecting said member to said brake rod for translating reciprocating movement of the brake rod into oscillatory movement of said member, and detent means common to said bracket and ratchet wheel for restraining reverse actuation of said ratchet wheel during return idling movement of the pawl.

2. The combination in accordance with claim 1 in which said connecting means comprises a stud extending radially outwardly of said member, and a link for connecting said stud to the brake rod.

3. The combination in accordance with claim 1 wherein said connecting means includes a rigid member adapted to be secured to the brake rod to form an extension thereof beyond the point of articulation thereof to the crank arm, a stud extending radially outwardly of said member, and a link adapted to be pivotally connected at its ends to the stud and distal end of the brake rod extension respectively.

References Cited in the file of this patent

UNITED STATES PATENTS

| | | |
|---|---|---|
| 1,661,191 | Midboe | Mar. 6, 1928 |
| 1,930,126 | Hamilton | Oct. 10, 1933 |
| 2,012,011 | Keller | Aug. 20, 1935 |
| 2,561,454 | Williams | July 24, 1951 |
| 2,752,009 | MacDougall | June 26, 1956 |